United States Patent
Chiang

(10) Patent No.: US 10,025,526 B2
(45) Date of Patent: Jul. 17, 2018

(54) STORAGE DEVICE AND DATA MOVING METHOD FOR STORAGE DEVICE

(71) Applicant: Silicon Motion, Inc., Jhubei, Hsinchu (TW)

(72) Inventor: Tsung-Yao Chiang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/396,783

(22) Filed: Jan. 2, 2017

(65) Prior Publication Data
US 2017/0262218 A1    Sep. 14, 2017

(30) Foreign Application Priority Data
Mar. 9, 2016    (TW) .............................. 105107232 A

(51) Int. Cl.
G11C 16/34    (2006.01)
G06F 3/06    (2006.01)
G06F 11/07    (2006.01)

(52) U.S. Cl.
CPC ............ *G06F 3/0647* (2013.01); *G06F 3/061* (2013.01); *G06F 3/064* (2013.01); *G06F 3/0611* (2013.01); *G06F 3/0616* (2013.01); *G06F 3/0653* (2013.01); *G06F 3/0679* (2013.01); *G06F 11/076* (2013.01); *G06F 11/0727* (2013.01)

(58) Field of Classification Search
CPC .... G06F 3/0647; G06F 3/0616; G06F 3/0653; G06F 3/0679; G06F 11/0729; G06F 11/076
USPC ..................................................... 365/189.15
See application file for complete search history.

(56) References Cited

U.S. PATENT DOCUMENTS

| 2014/0201580 A1 | 7/2014 | Desireddi et al. |
| 2016/0179406 A1* | 6/2016 | Gorobets ............. G06F 3/0653 711/103 |
| 2016/0179407 A1* | 6/2016 | Gorobets ............. G06F 3/0653 711/103 |

(Continued)

FOREIGN PATENT DOCUMENTS

| TW | 200915331 | 4/2009 |
| TW | 201005746 | 2/2010 |

(Continued)

OTHER PUBLICATIONS

Office Action issued by Taiwan Intellectual Property Office dated Jan. 17, 2017.

*Primary Examiner* — Vanthu Nguyen
*Assistant Examiner* — Xiaochun L Chen
(74) *Attorney, Agent, or Firm* — Chieh-Mei Wang

(57) ABSTRACT

A storage device includes a data storage medium having a plurality of data blocks and a control unit electrically coupled to the data storage medium. The control unit is configured to access data in the data blocks, perform data reading operations to obtain a plurality of data characteristic parameters of the data blocks, obtain a first value and a second value according to the data characteristic parameters, perform an additional data reading operation on a target block selected from the data blocks to obtain an additional data characteristic parameter of the target block, and determine whether to perform a data swap operation on the target block according to the data characteristic parameter of the target block, the first value and the second value. A data moving method for the storage device is also provided.

14 Claims, 2 Drawing Sheets

(56) References Cited

U.S. PATENT DOCUMENTS

| | | | | |
|---|---|---|---|---|
| 2016/0179428 A1* | 6/2016 | Parker | ............. | G06F 3/0653 |
| | | | | 711/103 |
| 2016/0179597 A1* | 6/2016 | Gorobets | ............. | G06F 3/0653 |
| | | | | 714/704 |
| 2016/0179602 A1* | 6/2016 | Gorobets | ............. | G06F 3/0653 |
| | | | | 714/47.2 |
| 2016/0179608 A1* | 6/2016 | Gorobets | ............. | G06F 3/0653 |
| | | | | 714/6.11 |
| 2016/0180951 A1* | 6/2016 | Darragh | ............. | G06F 3/0653 |
| | | | | 365/185.11 |
| 2016/0180959 A1* | 6/2016 | Darragh | ............. | G06F 3/0653 |
| | | | | 365/185.09 |

FOREIGN PATENT DOCUMENTS

| | | |
|---|---|---|
| TW | 201015335 | 4/2010 |
| TW | M1388066 | 9/2010 |
| TW | 201135453 | 10/2011 |
| TW | 201413451 | 4/2014 |
| TW | 201438020 | 10/2014 |
| TW | 1520140 | 2/2016 |

\* cited by examiner

STORAGE DEVICE AND DATA MOVING METHOD FOR STORAGE DEVICE

FIELD OF THE INVENTION

The present invention relates to data storage technology, and more particularly to a storage device and a data moving method for the storage device.

BACKGROUND OF THE INVENTION

In general, storage device is mainly constituted by a control unit and a data storage medium (for example, a flash memory). The data storage medium includes a plurality of data blocks, and each data block includes a plurality of data pages. The control unit is electrically coupled to the data storage medium and configured to perform data access or data erase on the data pages in the data blocks. It is understood that weakened data retention capability may result in data integrity issue; therefore, the control unit may use mechanisms, such as checking whether the bit error count (BEC) of the data pages in the data blocks is greater than a threshold, to determine whether the data stored in the data pages in the data blocks can be accessed normally. Once it is determined that the bit error count of the data pages in the data blocks is greater than the threshold, the control unit performs a data swap operation to move the stored data to another data block so as to ensure data integrity. However, the reasons to an increased bit error count may vary and frequent data moving may result in poor system performance. Therefore, the present invention provides a technical solution to the aforementioned problems.

SUMMARY OF THE INVENTION

One objective of the present invention is to provide a storage device capable of determining the reason to an abnormal data access of a data page in the data block and determining accordingly whether performing a data swap operation is required. Therefore, the storage device of the present invention effectively reduces the number of data swap operations and improves overall system performance.

Another objective of the present invention is to provide a data moving method for a storage device capable of determining the reason to an abnormal data access of a data page in the data block and determining accordingly whether performing a data swap operation is required. Therefore, the storage device of the present invention effectively reduces the number of data swap operations and improves overall system performance.

The present invention provides a storage device, which includes a data storage medium and a control unit. The data storage medium includes a plurality of data blocks. The control unit is electrically coupled to the data storage medium and configured to access data in the plurality of data blocks, perform a plurality of data reading operations on the data blocks to obtain a plurality of data characteristic parameters of the data blocks, and obtain a first value and a second value according to a calculation of the data characteristic parameters. The plurality of data characteristic parameters of the plurality of data blocks may be determined by a bit error count or a threshold voltage shift. The control unit is further configured to perform an additional data reading operation on a target block selected from the data blocks to obtain an additional data characteristic parameter of the target block. The control unit is further configured to determine whether to perform a data swap operation on the target block according to the additional data characteristic parameter, the first value and the second value.

The present invention further provides a data moving method for a storage device, which includes steps of: performing a plurality of data reading operations on a plurality of data blocks to obtain a plurality of data characteristic parameters of the data blocks in a data storage medium of the storage device; obtaining a first value and a second value according to a calculation of the data characteristic parameters; performing an additional data reading operation on a target block selected from the data blocks to obtain an additional characteristic parameter of the target block; and determining whether to perform a data swap operation on the target block according to the data characteristic parameter of the target block, the first value and the second value.

The present invention still further provides a data storage device, which includes a data storage medium and a control unit. The data storage medium includes a plurality of data blocks and each of the data blocks includes a plurality of data pages. The control unit is able to execute a plurality of data programming operations on the data blocks to store data from a host into the data pages, and able to actively execute a plurality of data reading operations on the data blocks to obtain a plurality of data characteristic parameters of the data pages, and able to calculate the data characteristic parameters to come out at least one value. The control unit is further configured to perform an additional data reading operation on a target block selected from the data blocks in a background mode to obtain an additional data characteristic parameter. The control unit is able to perform a data swap operation on the target block if the additional data characteristic parameter is equal or greater than the at least one value.

In summary, the control unit of the storage device of the present invention is configured to obtain the first value, the second value and the data characteristic parameter of the target block according to the above-described operation so as to determine the reason to an abnormal data access of the data page in the target block according to the obtained first value, second value and data characteristic parameter of the target block. Therefore, the control unit can determine whether to perform a data swap operation on the target block according to the aforementioned reason. As a result, the control unit can reduce the number of data swap operations and consequently the storage device of the present invention has improved overall system performance.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In general, an increased bit error count of a data page in a data block may be caused by aging of data (that is, data retention capability may be weakened over time or the number of write/erase) or aging of data storage medium itself (possibly caused by high temperature or long-term usage). Therefore, the present invention provides a mechanism to determine the reason causing to increase bit error count and perform proper operations according to the reason. As a result, the storage device of the present invention effectively reduces the number of data swap operations and the number of data write/erase and improves overall system performance.

Figure 1:
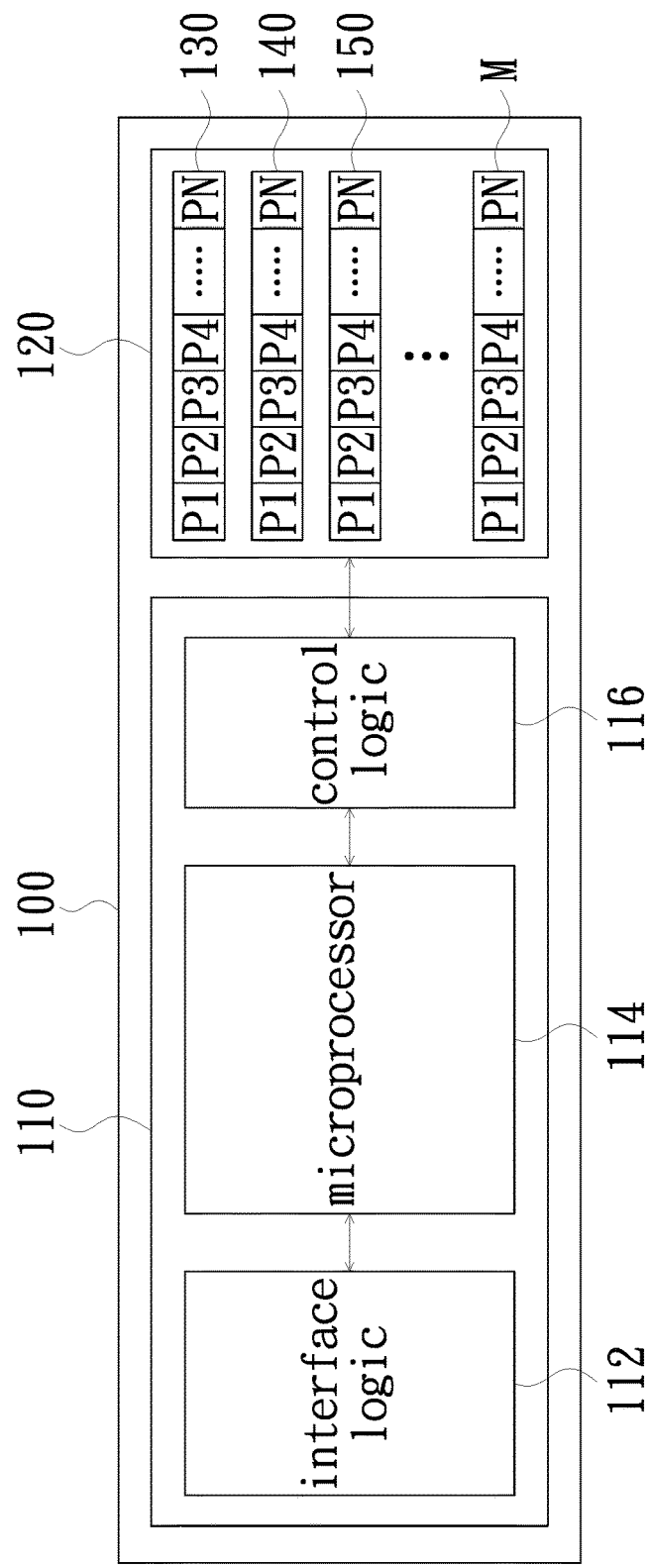
FIG. 1 is a schematic circuit block view of a storage device in accordance with an embodiment of the present invention.

FIG. 1 is a schematic circuit block view of a storage device in accordance with an embodiment of the present invention. As shown in FIG. 1, the storage device 100 of the present embodiment mainly includes a control unit 110 and a data storage medium 120. The data storage medium 120 includes a plurality of data blocks 130, 140, 150, . . . , and M, wherein M is a natural number. Each one of the data blocks includes a plurality of data pages P1, P2, P3, P4, . . . , and PN, wherein N is a natural number. In the present embodiment, the data storage medium 120 is implemented by a non-volatile random-access memory with longer data retention time, such as flash memory, magnetoresistive random access memory (Magnetoresistive RAM), ferroelectric random access memory (Ferroelectric RAM), resistive random access memory (RRAM), phase change random access memory (PRAM), etc.

As shown in FIG. 1, the control unit 110 is electrically coupled to the data storage medium 120 and configured to control an operation (e.g., data access or data erase) of the data storage medium 120. In the present embodiment, the control unit 110 includes an interface logic 112, a microprocessor 114 and a control logic 116. The microprocessor 114 is electrically coupled between the interface logic 112 and the control logic 116. The microprocessor 114 is configured to receive commands (e.g., write command, read command, erase command, etc.) or data from a host (e.g., an electronic device such as computer, mobile phone or digital camera with arithmetic function [not shown]) via the interface logic 112. The microprocessor 114 is further configured to perform data access or data erase on the data storage medium 120 via the control logic 116.

In the present embodiment, the microprocessor 114 performs data reading operations on the plurality of data pages in the plurality of data blocks to obtain a plurality of respective data characteristic parameters. In the present embodiment, the data characteristic parameter is a bit error count or a threshold voltage shift, but the present invention is not limited thereto. Then, the microprocessor 114 calculates an average and a standard deviation of the obtained data characteristic parameters and obtains a quality parameter of the data blocks by assigning different weights to the average and standard deviation. Then, the microprocessor 114 performs the data reading operation on a target block selected from the data blocks to obtain the data characteristic parameter (the bit error count or the threshold voltage shift) of the target block. Then, the microprocessor 114 compares the data characteristic parameter (the bit error count or the threshold voltage shift) of the target block with the quality parameter and determines accordingly whether to perform a data swap operation on the target block. The aforementioned operation of the storage device 100 will be described in detail as follows as exemplified by the data storage medium 120 being a flash memory.

First, under an operating mode, the microprocessor 114 writes the data transmitted from the host into the data pages in the data blocks of the data storage medium 120 according to a write command from the host. Specifically, when the data writing operation on one specific data page is completed, the microprocessor 114 reads the data in the specific data page and calculates the bit error count thereof. Accordingly, the microprocessor 114 can obtain a plurality of bit error counts once the data writing and data reading operations are completed for all of the data blocks. Then, the microprocessor 114 calculates the obtained bit error counts to obtain the average and the standard deviation thereof. Then, microprocessor 114 obtains the quality parameter of the data block(s) by assigning different weights to the average and the standard deviation; wherein the weights can be set according to actual requirements.

To improve the efficiency, it is to be noted that the microprocessor 114 may perform the data reading operation on only one of the data pages for each data block and then perform the aforementioned calculation. For example, each time when the data writing operation on one specific data block is completed, the microprocessor 114 then only performs the data reading operation on the Kth data page (e.g., the data page P1) of that specific data block. In one embodiment, the microprocessor 114 may select one specific data page for each data block randomly and then perform the aforementioned calculation. In another embodiment, the microprocessor 114 may select one specific data page for each data block according to a value set according to a setting table and then perform the aforementioned calculation. In still another embodiment, the microprocessor 114 may select one specific data page for each data block according to an equation and then perform the aforementioned calculation. In one embodiment, for example, the microprocessor 114 may sequentially perform the data reading operation on the data page P1 in the first data block (i.e., the data block 130), the data page P3 in the second data block (i.e., the data block 140), the data page P7 in the third data block (i.e., the data block 150), and so on. The aforementioned setting table and the equation are well known in the art, and no redundant detail is to be given herein.

Next, after the storage device 100 exits the operating mode or enters a background mode, the microprocessor 114 perform the data reading operation on one specific data page in the target block selected from the data blocks 130, 140, 150, . . . , and M to obtain the bit error count thereof. In one embodiment, the target block is preferable to be the data block having an oldest written data among the data blocks 130, 140, 150, . . . , and M; that is, among the data blocks 130-M, the target block is the first data block having been written with data. There are many means to determine which data block has the oldest written data. For example, the microprocessor 114 may manage a programming time table which records the sequences of the data blocks having been written data. In one embodiment, the programming time table may be stored in one data page, in an internal memory space (not shown) or in an independent electrically-coupled memory device. Further, in one embodiment, the programming time table may be realized by a link list. Accordingly, the microprocessor 114 can determine which physical data block has the oldest written data from the programming time table and then choose that data block as the target block. In addition, the data reading operation performed by the microprocessor 114 on the target block may be realized by reading at least one data page in the target block. For example, in one embodiment, the microprocessor 114 may perform the data reading operation on one data page only. In another embodiment, the microprocessor 114 may perform the data reading operation on a plurality of data pages. In still another embodiment, the microprocessor 114 may perform the data reading operation on a default data page(s). In still yet another embodiment, the microprocessor 114 may perform the data reading operation randomly.

After obtaining the bit error count of the target block, the microprocessor 114 then first determines whether the bit error count of the target block is greater than or equal to an error bit threshold. If it is determined that the bit error count of the target block is not greater than or equal to the error bit threshold, it is determined that the target block is in a good condition and no data retention capability issue is present; and therefore, there is no need to perform the data swap operation on the target block. Alternatively, if the bit error count of the target block is greater than the error bit threshold, it is determined that the target block is in a bad condition and data retention capability issue is present; and therefore, the next step is to determine the main reason causing to the increase of bit error count. In the present embodiment, the aforementioned determination is based on whether the bit error count is greater than the quality parameter; and correspondingly, the microprocessor 114 then determines whether to perform the data swap operation on the target block according to the comparison result between the bit error count and the quality parameter.

In the present embodiment, the quality parameter is a sum of A times of the average and B times of the standard deviation; wherein A and B may be integers, complex numbers, fractions, positive or negative, and can be set according to actual requirements. Specifically, when the bit error count of the target block is greater than the error bit threshold but smaller than the quality parameter, it is determined that the increased bit error count is caused by aging of the data storage medium itself; and therefore there is no need to perform the data swap operation on the target block. Alternatively, when the bit error count of the target block is greater than both of the error bit threshold and the quality parameter, it is determined that the increased bit error count is caused by aging of the stored data; and therefore there is a need to perform the data swap operation on the target block, and the microprocessor 114 would move the data of the target block to another data block (i.e., a spare block without valid data). In one embodiment, the microprocessor 114 may further perform garbage collection to collect valid data in a plurality data blocks (including the target block) into a spare block. It is understood that once the data swap operation or the garbage collection is completed, the microprocessor 114 may need to update the programming time table.

In the aforementioned exemplary embodiments, the microprocessor 114 is configured to perform the data reading operation to obtain the bit error count and define the obtained bit error count as the data characteristic parameter (that is, the data characteristic parameter is determined according to the bit error count); however, the present invention is not limited thereto. In another embodiment, the microprocessor 114 may be configured to perform the data reading operation to obtain the threshold voltage shift of at least one memory cell in a data page and define the obtained threshold voltage shift as the data characteristic parameter (that is, the data characteristic parameter is determined according to the threshold voltage shift).

Figure 2:
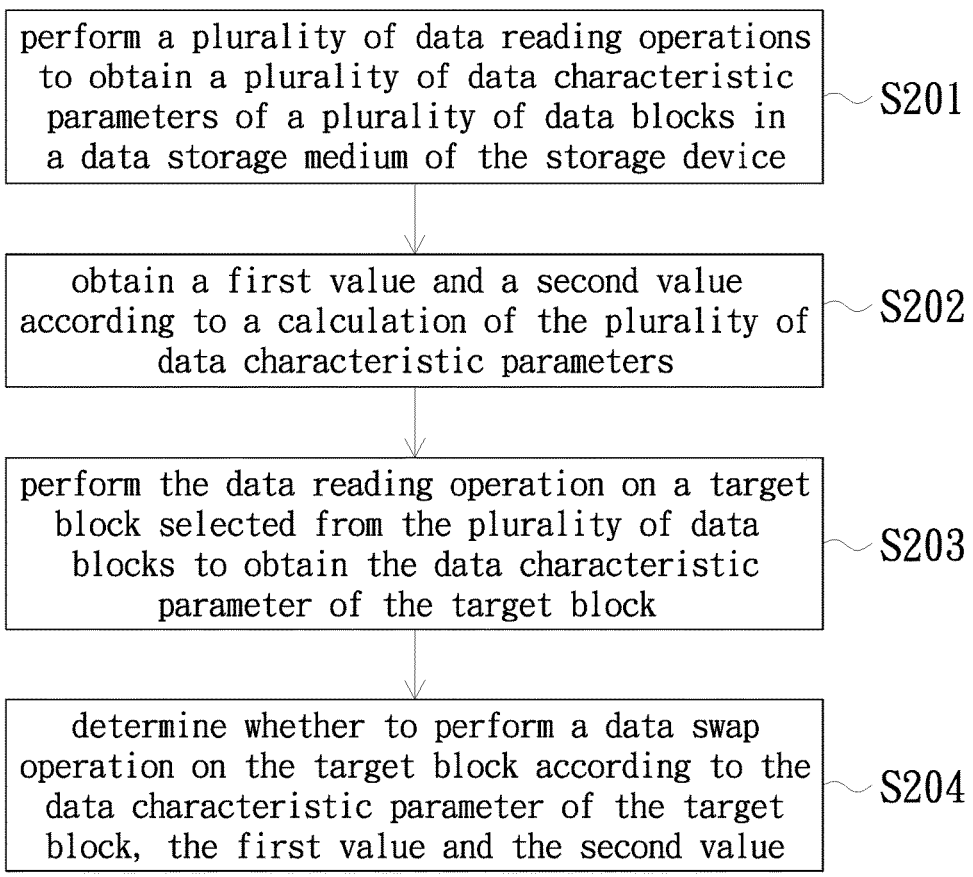
FIG. 2 is a flowchart of a data moving method for a storage device in accordance with an embodiment of the present invention.

A data moving method for a storage device can be developed according to the above teachings. FIG. 2 is a flowchart of a data moving method for a storage device in accordance with an embodiment of the present invention. As shown in FIG. 2, the data moving method of the present embodiment includes the steps of: performing a plurality of data reading operations to obtain a plurality of data characteristic parameters of a plurality of data blocks in a data storage medium of the storage device (step S201); obtaining a first value and a second value according to a calculation of the plurality of data characteristic parameters (step S202); performing the data reading operation on a target block selected from the plurality of data blocks to obtain the data characteristic parameter of the target block (step S203); and determining whether to perform a data swap operation on the target block according to the data characteristic parameter of the target block, the first value and the second value (step S204).

In summary, the control unit of the storage device of the present invention is configured to obtain the quality parameter of the data blocks and the data characteristic parameter of the target block according to the above-described operation so as to determine whether the abnormality of the stored data of the data page of the target block is caused by aging of the stored data or by aging of the data storage medium according to the obtained quality parameter and the data characteristic parameter of the target block. When it is determined that the abnormality of the stored data of the data page in the target block is caused by aging of the stored data, the control unit is then configured to perform the data swap operation. Alternatively, when it is determined that the abnormality of the stored data of the data page in the target block is caused by aging of the data storage medium, the control unit is then configured to not perform the data swap operation. As a result, the control unit can reduce the times of data swap operations and consequently the storage device of the present invention has improved overall system performance.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A storage device, comprising:
    a data storage medium, comprising a plurality of data blocks; and
    a control unit, electrically coupled to the data storage medium and configured to access data in the plurality of data blocks, perform a plurality of data reading operations on the data blocks to obtain a plurality of data characteristic parameters of the data blocks, and obtain a first value and a second value according to a calculation of the data characteristic parameters,
    wherein the control unit is further configured to perform an additional data reading operation on a target block selected from the data blocks to obtain an additional data characteristic parameter of the target block, wherein the control unit is further configured to determine whether to perform a data swap operation on the target block according to the additional data characteristic parameter, the first value and the second value, wherein the data characteristic parameters of the data blocks and the additional data characteristic parameter of the target block are determined by bit error counts obtained during the data reading operations and the additional data reading operation, the first value is an average and the second value is a standard deviation.

2. The storage device according to claim 1, wherein the data characteristic parameters of the data blocks and the additional data characteristic parameter of the target block are determined by threshold voltage shifts s obtained during the data reading operations and the additional data reading operation.

3. The storage device according to claim 1, wherein the target block is a data blocks having an oldest written data among the data blocks.

4. The storage device according to claim 1, wherein the control unit obtains the additional data characteristic parameter by performing the additional data reading operation on at least one data page in the target block.

5. The storage device according to claim 1, wherein the additional data reading operation is performed under a background mode.

6. The storage device according to claim 1, wherein a quality parameter is obtained by summing A times of the first value and B times of the second value, wherein A and B are real numbers.

7. The storage device according to claim 6, wherein the control unit performs the data swap operation on the target block when the additional data characteristic parameter is equal to or greater than the quality parameter.

8. A data moving method for a storage device, comprising steps of:
performing a plurality of data reading operations on a plurality of data blocks to obtain a plurality of data characteristic parameters of the data blocks in a data storage medium of the storage device;
obtaining a first value and a second value according to a calculation of the data characteristic parameters;
performing an additional data reading operation on a target block selected from the data blocks to obtain an additional data characteristic parameter of the target block; and
determining whether to perform a data swap operation on the target block according to the data characteristic parameter of the target block, the first value and the second value,
wherein the data characteristic parameters of the data blocks and the additional data characteristic parameter of the target block are determined by bit error counts obtained during the data reading operations and the additional data reading operation, the first value is an average and the second value is a standard deviation.

9. The data moving method for a storage device according to claim 8, wherein the data characteristic parameters of the data blocks and the additional data characteristic parameter of the target block are determined by threshold voltage shifts obtained during the data reading operations and the additional data reading operation.

10. The data moving method for a storage device according to claim 8, wherein the target block is defined as the data block having an earliest written data among the plurality of data blocks.

11. The data moving method for a storage device according to claim 8, further comprising a step of: performing the data reading operation on at least one data page in the target block under a background mode to obtain the data characteristic parameter of the target block.

12. The data moving method for a storage device according to claim 8, further comprising steps of:
obtaining a quality parameter by summing A times of the first value and B times of the second value; and
determining whether to perform the data swap operation on the target block by determining whether the data characteristic parameter of the target block is equal to or greater than the quality parameter.

13. The data moving method for a storage device according to claim 8, wherein the data storage medium is a flash memory.

14. A data storage device, comprising:
a data storage medium, comprising a plurality of data blocks and each of the data blocks comprising a plurality of data pages; and
a control unit, able to execute a plurality of data programming operations on the data blocks to store data from a host into the data pages, and able to actively execute a plurality of data reading operations on the data blocks to obtain a plurality of data characteristic parameters of the data pages, and able to calculate the data characteristic parameters to come out at least one value,
wherein the control unit is further configured to perform an additional data reading operation on a target block selected from the data blocks in a background mode to obtain an additional data characteristic parameter, wherein the control unit is able to perform a data swap operation on the target block if the additional data characteristic parameter is equal or greater than the at least one value,
wherein the data characteristic parameters and the additional data characteristic parameter are determined by bit error counts obtained during the data reading operations and the additional data reading operation, and the at least one value is an average.

* * * * *